Nov. 15, 1955     J. P. ROSS     2,723,694
SCREW DRIVER ATTACHMENT
Filed Jan. 23, 1953
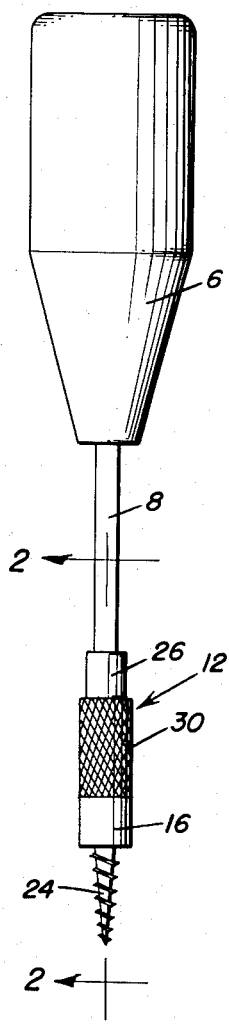
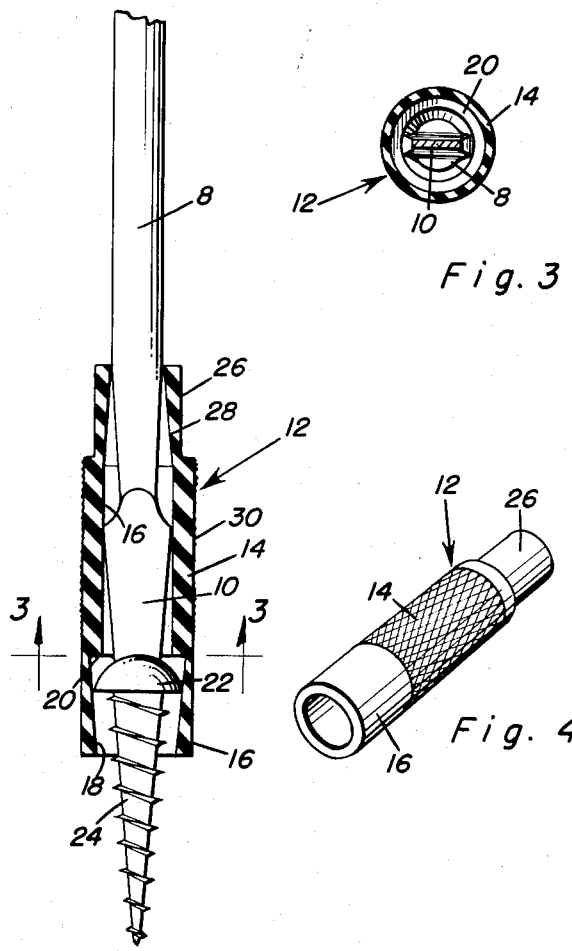
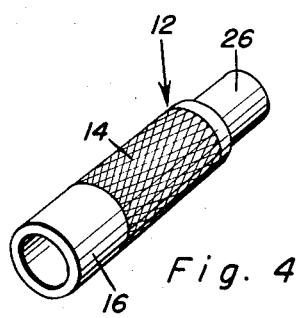
James P. Ross
INVENTOR.

United States Patent Office 2,723,694
Patented Nov. 15, 1955

2,723,694

SCREW DRIVER ATTACHMENT

James P. Ross, Bellefontaine, Ohio

Application January 23, 1953, Serial No. 332,971

1 Claim. (Cl. 145—50)

This invention relates to a readily applicable and removable attachment for the bit of a screw driver shank wherein said attachment is constructed to serve as a holder and starter for a screw.

The art to which the invention relates comprehends the use of many and varied styles and forms of screw holders and starters. The common purpose of these devices is to retain the bit of the screw driver shank in the kerf of the head of the screw and to temporarily couple the screw and bit together so that the shank of the screw may be readily and reliably piloted into places difficult of access, making it possible to start the screw into the workpiece with which it is to be joined. One example of screw driver screw holder is shown in a patent to Gentry Shelton under 797,078 of August 15, 1905. Another type is shown in a patent to Michael Coll under 1,360,500 of November 30, 1920. The object of the instant invention is to structurally, functionally and otherwise improve upon these prior patented constructions and any others in the same category of invention and, in doing so, to provide an improved holder attachment in which manufacturers, users and others will find their respective requirements and needs aptly met.

A large mouth in a screw holder and starter is undesirable. It is an object in the instant invention to fashion the screw head accommodtaion and gripping means which forestalls accidental dislodgement of the screw and provides a greater gripping strength.

Another object of the invention is to provide the head accommodation means so that it is easier to align the screw with the shank of the screw driver, something which is more difficult to attain in the prior patents and art which has come to my attention.

A further object of the invention is to provide ways and means whereby a more reliable grip on the head of the screw is assured which retains its effectiveness even after considerable wear and to do away with a bell-shaped end which not only fails to assure the gripping action desired but provides an obstruction which interferes with the line of vision when one is working in a close and perhaps dark space and using the beam of a flashlight to obtain a bead on the area in which the screw is to be lodged and screwed into place.

A further object of the invention is to provide a rubber or equivalent sleeve both ends of which are properly bored with the bores suitably shaped to provide optionally or selectively usable grips thus providing a device which is double-ended with one end made to accommodate large screws and the other end to accommodate smaller screws.

A still further object is to provide a structure as stated which assures a strong grip, easy alignment of the screw with the shank of the screw driver, requires the least possible working clearance, does not obscure the line vision and permits the holding and starting of screws ranging from small to large.

Further, novelty is predicated on a holding sleeve with a knurled portion with the knurled surface providing an adequate grip for the user even when the fingers are covered with grease or oil.

Then, too, novelty is predicated on a holder for screws wherein the respective grips at the opposite ends are such that they are susceptible of being cut off and made short in order to regain lost tension as often happens where rubber on an equivalent material is utilized.

In carrying out the preferred embodiment of the invention the holder takes the form of a rubber or equivalent sleeve of requisite strength and resiliency. The intermediate portion of the sleeve is cylindrical in cross-section and this provides the primary place of anchorage for the bit on the screw driver shank. One end is counterbored to provide a tapering grip and the other end is likewise counterbored to provide a tapering grip which is smaller in cross-section. Thus, two grips are provided one on each side of the center cylindrical portion into which the bit of the shank is inserted and frictionally held.

Objects, features and advantages in addition to those specifically mentioned will become more readily apparent from the following description and the accompanying sheet of drawings.

In the drawings wherein like numerals are employed to designate like parts throughout the views:

Figure 1 is an elevational view showing a screw, a screw driver and the screw holding and starting attachment constructed in accordance with the invention and illustrating its use;

Figure 2 is an enlarged section on the line 2—2 of Figure 1 looking in the direction of the arrows;

Figure 3 is a cross-section on the line 3—3 of Figure 2 looking in the direction of the arrows; and Figure 4 is a perspective view of the attachment by itself.

Referring now to the drawings, the screw driver comprises a handle 6 carrying a shank 8 terminating in the usual wedge-shaped blade or bit 10 as best shown in Figure 2. The over-all attachment is denoted by the numeral 12. This is of a suitable grade of tough rubber characterized by prerequisite resilient properties. The sleeve from a point of exterior consideration is substantially cylindrical from one end to the other. The primary central body portion 14 is a substantially true cylinder and, therefore, has a cylindrical bore 16 into which the bit 10 is wedged and frictionally anchored in place in the manner illustrated. One end portion which may be called a screw gripper 16 is characterized by what may be called a counterbore 18 which tapers, that is, enlarges in a direction toward the main passage or bore 18 where it terminates in a shoulder 20. This counterbore appears substantially truncated-conical in form and lends itself admirably well to accommodating and adequately holding screws of different sizes. Here, the head of the screw is denoted by the numeral 22 and the shank by the numeral 24. The holder 26 at the opposite end is reduced to form what may be called a neck and the bore or passage of this is also counterbored so that it is tapered as at 28. This counterbore may be perhaps described as truncated-conical in form. It is smaller in cross-section than the bore 18. Hence the grip 16 is for larger screws and the grip 26 for smaller screws. The over-all device is preferably constructed of a rubber product which is to be made up in a manner to resist the disruptive effects of deleterious agents such as oil, water, heat and so on. The grips shown will serve to accommodate screw heads of the Phillips, Allen, clutch and others, whether the screws be machine screws, or for wood or metal as the case may be.

It will be clear from the specification and drawings that the device is unique in that the major or central portion is cylindrical in cross-section and of substantially uniform cross-section insofar as the passage or bore 16 is concerned. To assist in using and holding the device the surface of this portion of the same is preferably knurled or otherwise roughened as at 30. The grips 16 and 26 of varying cross-sectional dimensions projecting beyond the ends of the knurled central portion are unique and render the over-all instrumentality of an appreciable degree of utility compared to similarly constructed and performing prior art devices.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is:

A screw holder and starter attachment for the bit of a screw driver shank comprising an elastic sleeve the central body portion of which is formed with a cylindrical bore and is externally cylindrical from end to end, said bore being of uniform diameter from end to end, one end of the body portion being formed into a screw holding grip and the bore of said grip being of truncated-conical form with a larger diametered portion in close proximity to the bore of the body portion and defining a shoulder at the juncture of the respective bore and counterbore, the opposite end of said body portion being reduced in cross-section and having a tapered bore with the enlarged tapering portion directed toward the adjacent end of the cylindrical bore in said body portion to provide optionally and selectively usable grips at opposite ends of the body portion and to permit the grips to be constructed to accommodate screws of varying sizes.

References Cited in the file of this patent

UNITED STATES PATENTS

| | | |
|---|---|---|
| 768,441 | Fisher | Aug. 23, 1904 |
| 1,360,500 | Coll | Nov. 30, 1920 |
| 2,069,108 | Kuhlman | Jan. 26, 1937 |
| 2,701,491 | Ross | Feb. 8, 1955 |